(12) United States Patent
Vroom

(10) Patent No.: US 10,480,627 B1
(45) Date of Patent: Nov. 19, 2019

(54) SLIDING SUPPORT MECHANISM WITH IMPROVED RELIABILITY AND SERVICEABILITY

(71) Applicant: David H. Vroom, Tucson, AZ (US)

(72) Inventor: David H. Vroom, Tucson, AZ (US)

(*) Notice: Subject to any disclaimer, the term of this patent is extended or adjusted under 35 U.S.C. 154(b) by 0 days.

(21) Appl. No.: 16/268,235

(22) Filed: Feb. 5, 2019

(51) Int. Cl.
*F16H 19/04* (2006.01)
*B60P 3/34* (2006.01)

(52) U.S. Cl.
CPC ............... *F16H 19/04* (2013.01); *B60P 3/34* (2013.01)

(58) Field of Classification Search
CPC ..................................... F16H 19/04; B60P 3/34
See application file for complete search history.

(56) References Cited

U.S. PATENT DOCUMENTS

| | | | |
|---|---|---|---|
| 5,758,918 A * | 6/1998 | Schneider | B60P 3/34 296/171 |
| 5,833,296 A * | 11/1998 | Schneider | B60P 3/34 296/26.13 |
| 8,016,343 B2 | 9/2011 | Schwindaman et al. | |
| 8,317,250 B2 | 11/2012 | Schwindaman et al. | |
| 8,581,540 B2 | 11/2013 | Schwindaman et al. | |
| 9,193,291 B2 | 11/2015 | Schwindaman et al. | |
| 2002/0047286 A1 * | 4/2002 | Nye | B60P 3/34 296/26.13 |
| 2002/0171255 A1 * | 11/2002 | Eichhorn | B60P 3/34 296/26.01 |
| 2002/0180232 A1 * | 12/2002 | Schneider | B60P 3/34 296/26.01 |
| 2003/0141732 A1 * | 7/2003 | Nye | B60P 3/34 296/26.01 |
| 2004/0066060 A1 * | 4/2004 | Rasmussen | B60P 3/34 296/165 |
| 2014/0159410 A1 * | 6/2014 | Rasmussen | A47C 19/20 296/24.33 |

* cited by examiner

*Primary Examiner* — Terence Boes
(74) *Attorney, Agent, or Firm* — Quarles & Brady LLP; Gavin J. Milczarek-Desai

(57) ABSTRACT

Motorized rack-and-pinion sliding support mechanisms are disclosed. One or more shafts are coupled to pinions configured to engage with one or more racks and configured to be driven by one or more motors. The shaft(s) are configured to be manually disengageable from the motor(s), allowing the mechanism to slide freely in the event of a motor failure. The mechanism is further configured to reduce premature component wear leading to poor gear mesh caused to by forces on the mechanism during use.

10 Claims, 7 Drawing Sheets

SLIDING SUPPORT MECHANISM WITH IMPROVED RELIABILITY AND SERVICEABILITY

BACKGROUND

Motorized sliding support mechanisms are well-known and used to support structures whose position needs to change under different circumstances. An example is a motorized drawer. A more demanding example application is a "slide-out" module commonly included in a recreational vehicle (RV) or motor home. RVs will frequently include living spaces which can be expanded when the vehicle is parked to provide additional room. These "slide-outs" extend from the outer walls of the vehicle and are suspended over the ground. For convenience, and because slide-outs can be extremely heavy, it is often desirable to provide them with a motorized mechanism to automatically extend and retract the slide-out as desired. Some of these motorized mechanisms use a set of rack and pinions connected to the sides of the slide-out. Electric motors drive the pinions which engage with the rack and drive the slide-out forward or backward relative to the pinions which are typically mounted in an assembly which includes the motor and resides within a compartment within a side of the vehicle.

Conventional motor-driven sliding support mechanisms such as those used for RV slide-outs have deficiencies. For example, the rack and pinions may be prone to binding or degradation (e.g., abrasion and wear of teeth on the pinions and the corresponding grooves in the rack) which reduces the ability of the motor to slide the supported structure with the electrical power available. Some conventional mechanisms can result in poor gear mesh with the rack under common operating conditions. Additionally, some conventional mechanisms fail to solidly couple the motor to the shaft and other components, which can lead to severed motor wires when the mechanism experiences unexpected movements or forces. These and other problems may cause the motor to fail. Furthermore, the mechanisms coupling the motor to the pinions frequently make it difficult or impossible to move the mechanism manually in the event of a motor failure. In the example of an RV slide-out, these failures may occur in remote locations while also making it dangerous or impossible to drive the RV to a repair facility.

SUMMARY

Improved sliding support mechanisms disclosed herein address at least several particular deficiencies of known motorized sliding support mechanisms. First, embodiments disclosed herein use racks and pinions configured to ensure proper meshing between the pinion teeth and rack grooves, even when the mechanism experiences mechanical forces which will tend to move these components out of alignment. For instance, when an RV slide-out is deployed, the racks may experience a downward force due to weight of the slide-out which is suspended beyond the walls of the RV. Similarly, if the slide-out has a non-uniform mass distribution, or the RV rests on an unleveled surface, the racks and pinions may experience lateral torques that will tend toward misalignment of the pinions with their corresponding racks.

Second, embodiments disclose herein enable the motor(s) to remain solidly coupled to the shaft and other components at all times during operation of the mechanism, dramatically reducing the opportunity for damage to the motor(s) and any electrical connections due to stresses experienced during unexpected movements.

Third, embodiments herein improve serviceability in the event of motor failures. Specifically, embodiments disclosed herein allow the pinions to be easily decoupled from the motor(s) and later re-coupled without requiring excessive disassembly and reassembly of the support mechanism. One example advantage of these improvements is that an RV slide-out can be easily operated manually by a non-mechanic (i.e., an untrained owner), allowing the RV to be safely used and driven, even in the event of motor failure.

Exemplary embodiments of improved sliding support mechanisms include a first rack and a first pinion. The first pinion is configured to couple to the first rack and the first rack has a first translational axis when coupled to the first pinion. Such embodiments further include a motor having a rotor; a shaft having a first end and a second end; a bearing; and an upper housing/

The shaft is configured to couple to both the rotor and to the first pinion at the first end of the shaft. The bearing is configured to receive the shaft and encircle the shaft at a point between the rotor and the second end of the shaft. The upper housing is configured to couple to the first end of the shaft and to the motor.

When the upper housing is coupled to the first end of the shaft, the upper housing is further configured to house the bearing and the first end of the shaft. When the shaft is coupled to the first pinion, the shaft is configured to rotate within the bearing. When the shaft and the rotor are coupled, the shaft and rotor are mutually configured such that the shaft is disengageable from the rotor. Finally, when the shaft and the rotor are disengaged, the first rack is configured to translate freely along the first translational axis when a force is applied to the support mechanism in a direction parallel to the first translational axis.

In certain other embodiments the mechanism has two tracks parallel to each other which can be mounted on the side of an object requiring a sliding support. Each track is engaged by the teeth of a corresponding pinion. The two pinions are coupled to a rotating shaft driven by a motor. To reduce the potential for wear and other damage to the shaft which may cause misalignment of the racks and pinions, the shaft rotates within a bearing, which may be a needle bearing or other suitable bearing. The pinions are designed to mesh cleanly with the teeth of the track.

Such embodiments may include a first rack and a first pinion configured to couple to the first rack; a second rack and a second pinion configured to couple to the second rack; a first motor having a first rotor; a first bearing configured to receive the first end of the shaft and encircle the shaft at a point below the first rotor and below the first track; and a frame coupled to the first and second racks.

In these embodiments the first and second racks have translational axes parallel to each other. The first shaft is configured to couple to both the rotor of the first motor and to the first pinion at a first end of the first shaft. The first and second racks coupled to a first side of the frame. The first bearing is configured to receive the first end of the first shaft and encircle the first shaft at a point below the first rotor and below the first track When the shaft is coupled to the first pinion, the first shaft is configured and arranged to rotate within the bearing. When the first shaft and the first rotor are coupled, the first shaft and the first rotor are mutually configured and such that the first shaft is disengageable from first the rotor. When the first shaft and the first rotor have been disengaged, the first and second racks are configured to translate freely along the first translational axis when a force is applied to the frame in a direction parallel to the first translational axis.

BRIEF DESCRIPTION OF THE FIGURES

Advantages of embodiments of the present invention will be apparent from the following detailed description of the exemplary embodiments thereof, which description should be considered in conjunction with the accompanying drawings in which.

DETAILED DESCRIPTION OF THE INVENTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description, discussion of several terms used herein follows.

The word "exemplary" is used herein to mean "serving as an example, instance, or illustration." Any embodiment described herein as "exemplary" is not necessarily to be construed as preferred or advantageous over other embodiments. Likewise, the terms "embodiments of the invention," "embodiments" or "invention" do not require that all embodiments of the method, system or apparatus include the discussed feature, advantage or mode of operation.

For ease of illustration, descriptions of embodiments herein make use of directional terms such as 'upper', 'lower', 'inner', 'outer', 'top', 'bottom', et al. It should be understood that these terms are not meant to limit the embodiments herein by required any preferred orientation and, rather, are used to make spatial relationships between various parts more readily understood with reference to the orientation of the figures. It should also be understood that substantially similar components are at times identified using a single reference number for clarity. For instance, each pinion belonging to a pair of pinions may be referred to as a pinion 106. It should also be understood that the present Application makes reference to slide-outs and other similar structures as examples to aid in understanding features and advantages of the invention, and not to limit the invention to the examples herein.

Figure 1A:
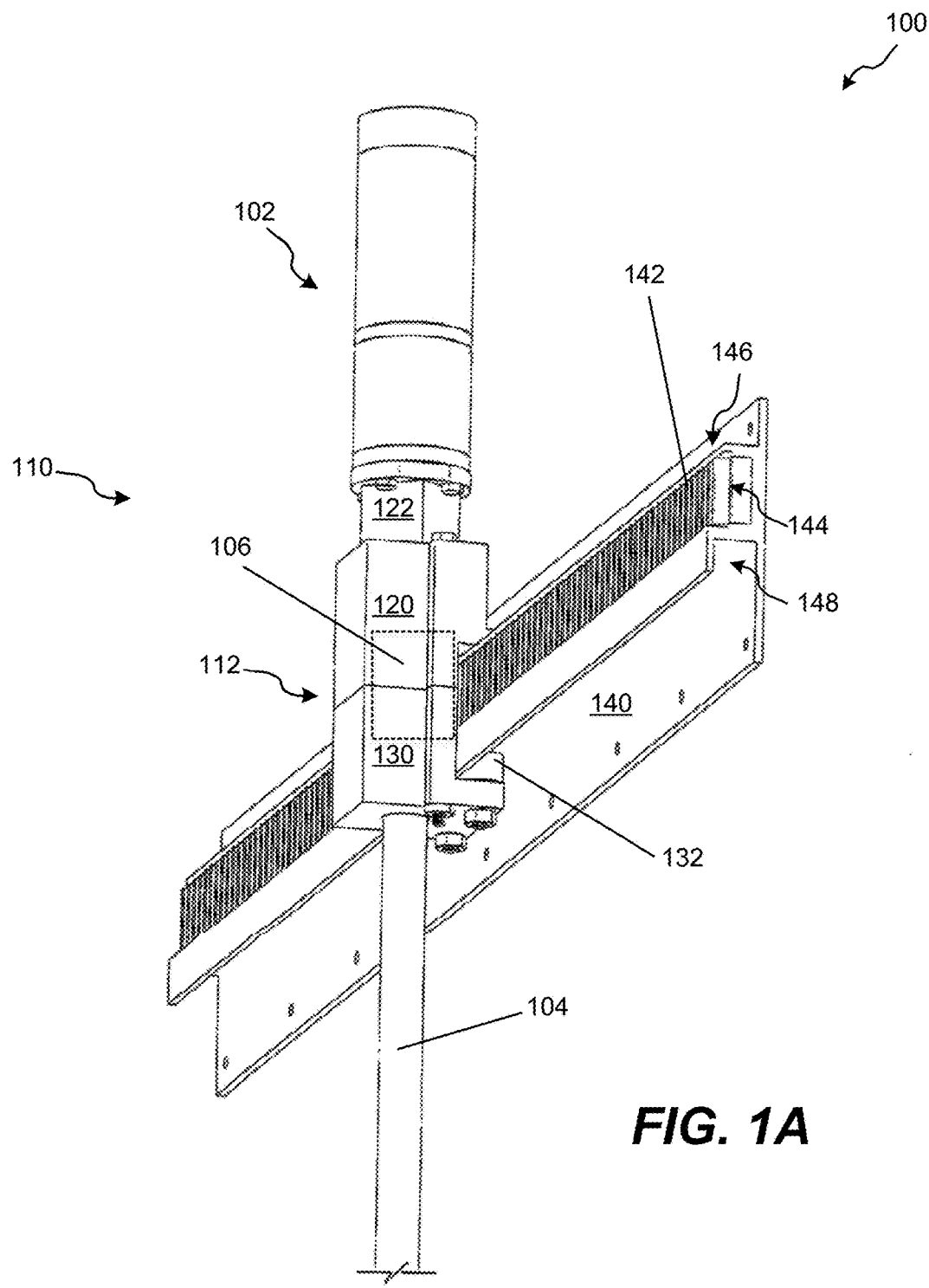
FIG. 1A is a perspective view of an exemplary embodiment.
Figure 1B:
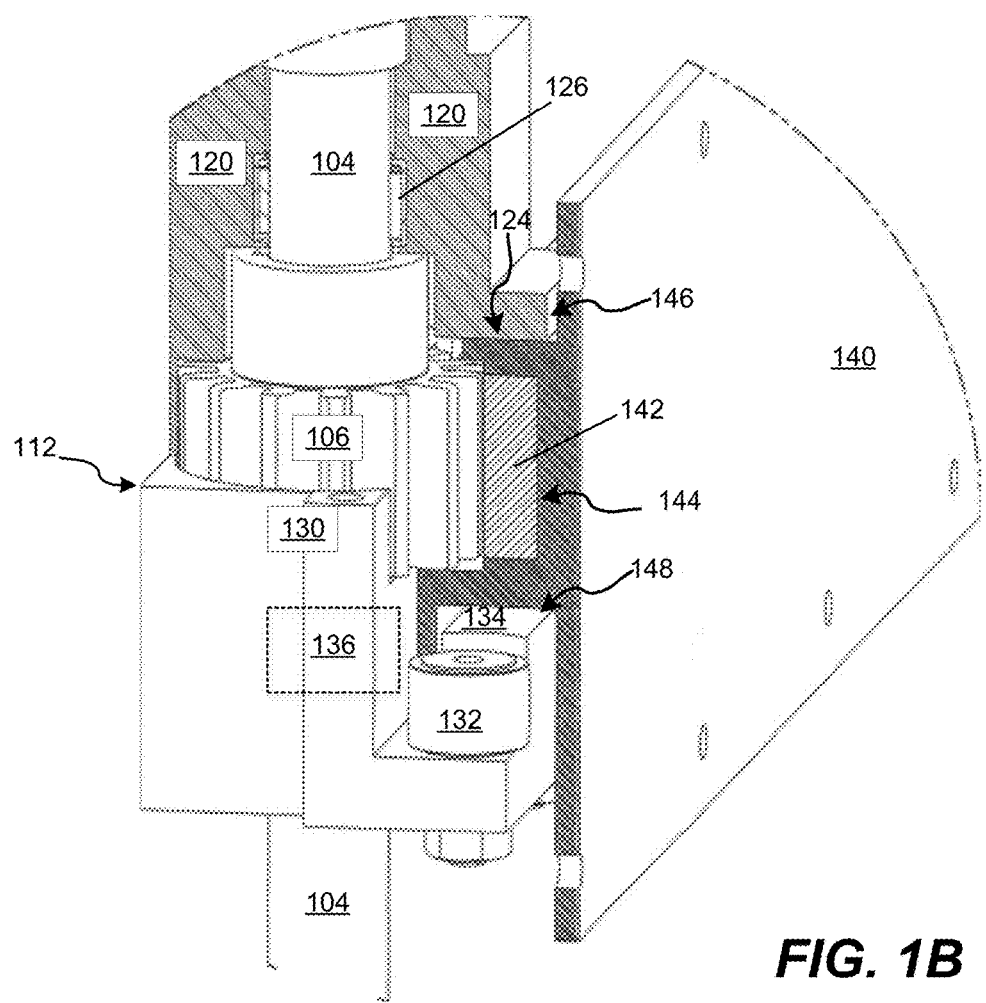
FIG. 1B is a cross-sectional perspective view showing further details of the embodiment shown in FIG. 1A.

FIGS. 1A-1B show key features of an example sliding support mechanism 100. Referring to FIG. 1A, the mechanism 100 includes a shaft assembly 110 and a rack assembly 140. As shown, the shaft assembly 110 includes a motor assembly 102, a shaft 104, a pinion 106, an upper shaft housing 120, and a lower shaft housing 130.

The motor assembly 102 is attached to the upper shaft housing 120 by a motor coupling 122. The shaft assembly 110 is configured to couple to a rack 142. The shaft assembly 110 includes at least one pinion 106 (shown in detail in FIG. 1B), which is configured to couple to the shaft 104 and to engage the rack assembly 140. The lower shaft housing 130 includes at least a pair of rollers 132 (one of which is shown in FIG. 1A). The upper and lower housings also include various wear surfaces and house at least one bearing (these elements, which are not shown in FIG. 1A, will be described below with reference to FIG. 1B). For convenience, the upper shaft housing 120 and the lower shaft housing 130, taken together with the components they house may be referred to as a pinion assembly 112.

The rack assembly 140 includes a rack 142 and a recess 144 in which the rack 142 is secured. The recess has a top surface 146 which forms a roof of the recess 144. The recess 144 includes a floor structure 148, which also forms an inverted U-shaped channel. The rack assembly 144 is shown with various holes to allow the rack assembly to be secured to an object or structure (not shown) in order to enable the object or structure to be translated along the long axis of the rack 142.

When the shaft assembly 110 is coupled to the rack assembly 140, the rollers 132 rest within the channel 148 of the rack assembly 140. The rollers 132 are configured to roll along the channel 148, reducing friction and allowing the motor assembly 102 to more efficiently drive linear motion of the rack assembly 140 relative to the shaft assembly 110. The rollers 132, acting together with the walls of the channel 148, also serve to keep the shaft assembly 110 (and particularly the pinion 106) in alignment with the rack 142, countering any reactive back-torque on the rack 142 during operation of the motor assembly 102 as well as any external torques.

FIG. 1B is a hybrid cross-sectional perspective view with cutaways to illustrate certain features in greater detail. In particular, portions of the upper shaft housing 120 are removed to clearly show the pinion 106. As shown, the pinion 106 has a main body with teeth configured to engage with the teeth of the rack 142 as well as a collar immediately above the teeth. In preferred embodiments, the shaft 104 passes through a circular opening in the pinion 106. The shaft has a key (not pictured) which fits into a slot (not shown) in the pinion 106. The shaft 104 is encircled by a bearing 126. In some embodiments, the shaft 104 is optionally encircled by additional bearings such as bearing 136 (shown residing within the lower shaft housing 130).

FIG. 1B also more clearly shows one of the rollers 132 which is coupled to the lower shaft housing 130 in certain preferred embodiments. Also shown adjacent to the roller is a lower wear surface 134 which protrudes from the lower shaft housing 130. The lower wear surface 134 provides a stop against excessive vertical displacement of the rack assembly 140 (and particularly rack 142) relative to the shaft assembly 110 (and particularly the pinion 106). In preferred embodiments, the wear surface 134 is either constructed from a softer material than the area of the channel 148 it is designed to contact or it is coated with such a material. In preferred embodiments, this material is also chosen to reduce friction between the wear surface and the channel 148. Although depicted as a continuous portion of the lower shaft housing 130, the lower wear surface 134 may be configured as a separate object which couples to the rest of the lower shaft housing 130. It should be appreciated that the features of the wear surface 134 described above confer certain advantages, namely: directing a greater degree of wear to a part which is more easily accessed for service and allowing an exhausted wear surface to be replaced (or recoated), thereby greatly extending the operational lifetime of the overall support mechanism.

FIG. 1B also shows an upper wear surface 124 on the upper shaft housing 120. Similarly to the lower wear surface 134, this wear surface also serves a mechanical stop against excessive vertical displacement of the rack assembly 140 relative to the shaft assembly 110. In preferred embodiments, the upper wear surface 124 is formed from a material chosen to reduce friction between the wear surface and the channel 148 and softer than the roof 146 formed by the recess 144. Although depicted as a continuous portion of the upper shaft housing 120, the upper wear surface 124 may be configured as a separate object which couples to the rest of the upper shaft housing 120. It should be appreciated that the features of the upper wear surface 124 described above confer similar advantages to those discussed above in connection to the lower wear surface 134.

Figure 1C:
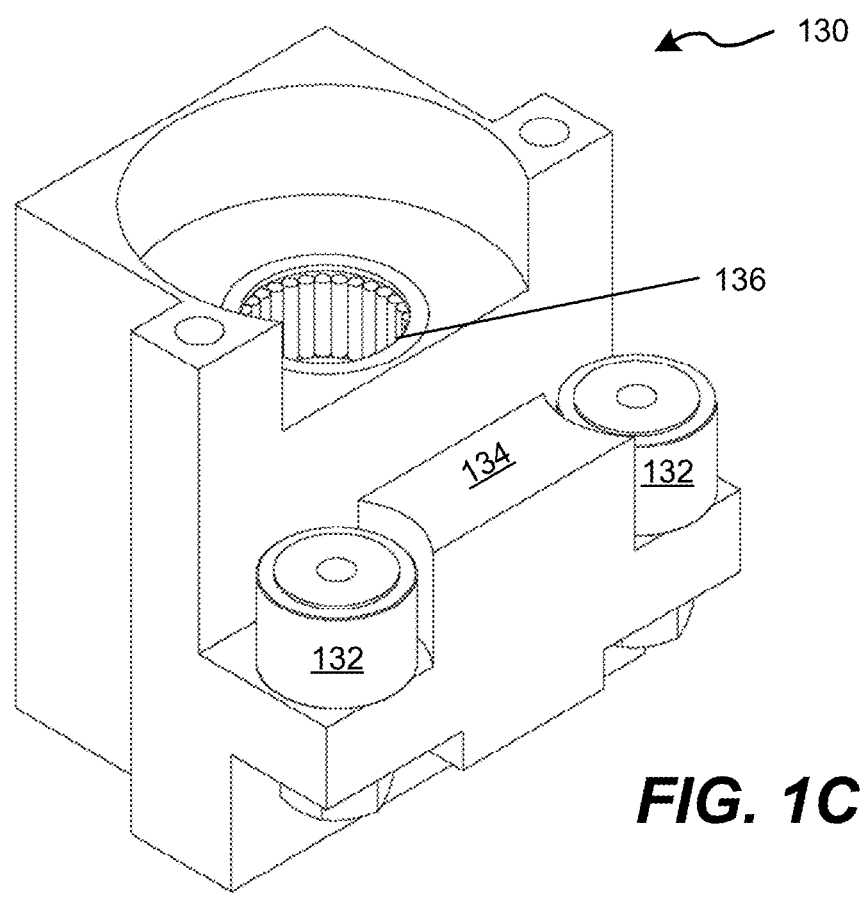
FIG. 1C is a detailed perspective view of selected elements shown in FIGS. 1A and 1B.

Additional details concerning the rollers 132, the wear surfaces 124 and 134, and the lower shaft housing 130 are visible in FIG. 1C, an isolated perspective view of the lower shaft housing 130. In particular, FIG. 1C clearly shows both rollers 132 positioned on either side of the lower wear surface 134, which extends above the height of the rollers 132, ensuring that the rollers 132 do not contact the floor 148 of the rack assembly 140 during operation. The rollers 132 are pictured as conventional cam followers, but other devices are also suitable.

Figure 2:
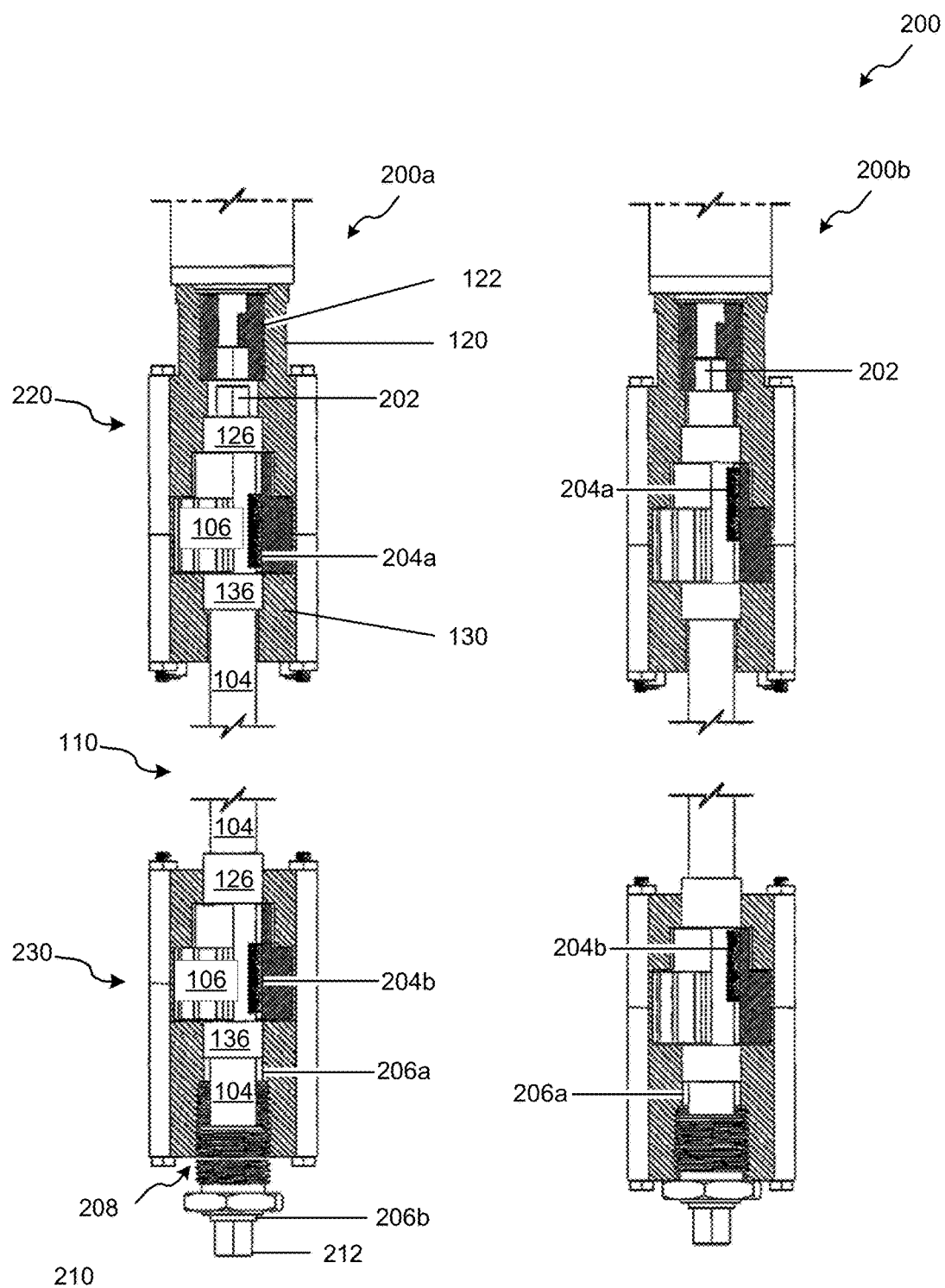
FIG. 2 is a cross-sectional view of an alternate embodiment in two different configurations.

Various embodiments comprise a shaft assembly 110 with a pair of pinions 108 and a corresponding pair of rack assemblies 140, each having a rack 142 and other elements described above. FIG. 2 shows one such embodiment 200 (only the shaft assembly 110 is shown). Embodiment 200 is shown in two different configurations, 200a and 200b. Together, these configurations illustrate a key feature of preferred embodiments: the ability to manually disengage the shaft 104 from the motor assembly 102 (not pictured in FIG. 2). For greater ease in understanding differences between the two configurations, only elements arranged differently between configuration 200a and 200b are labeled for configuration 200b. Although the components of shaft assembly 110 may be provided as discrete parts of sub-assemblies, portions of the foregoing discussion will describe shaft assembly 110 in a fully assembled state.

Figure 3:
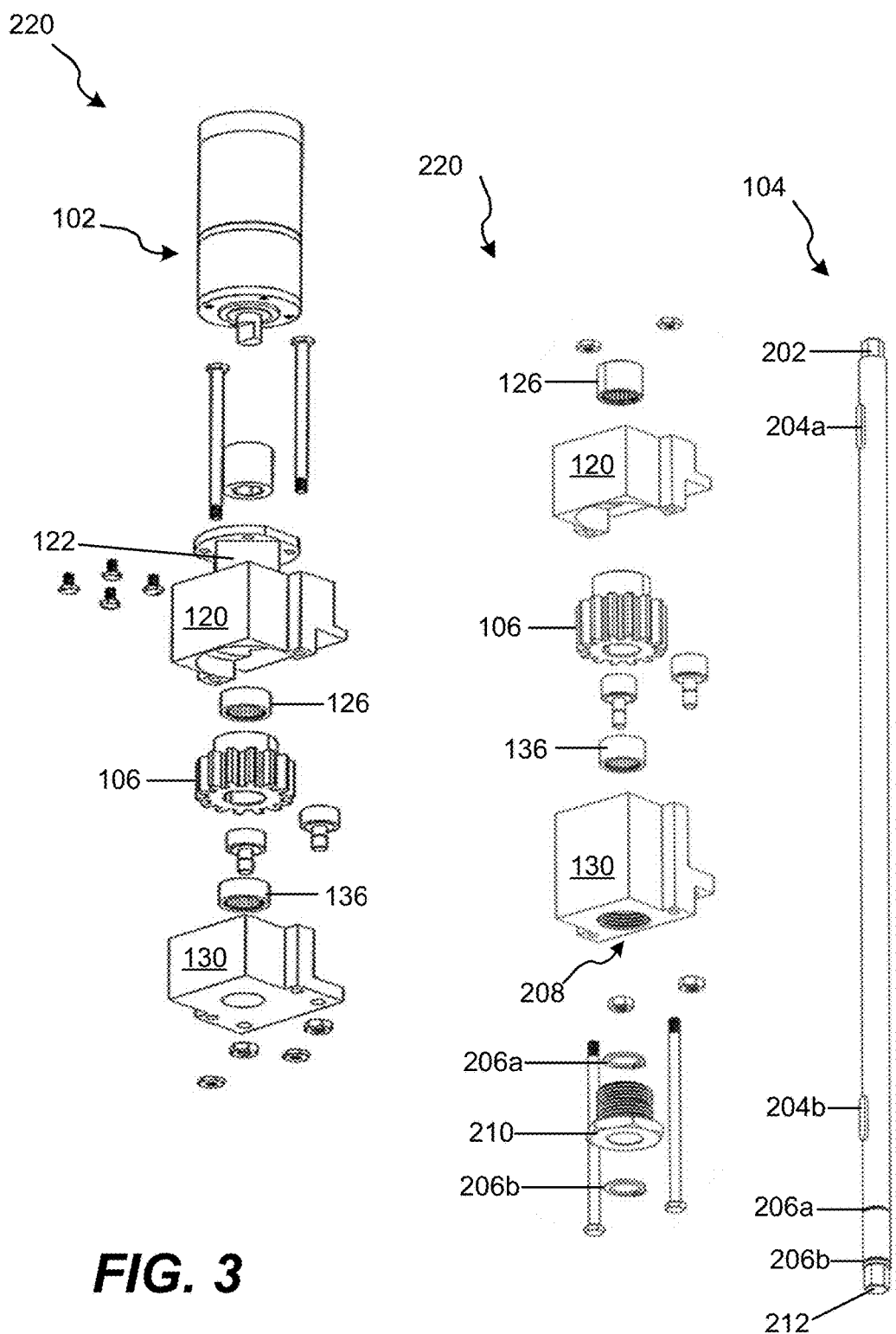
FIG. 3 is an exploded perspective view of selected elements shown in FIGS. 1A, 1B. 1C, and FIG. 2.

In example embodiment 200, the shaft assembly 110 includes an upper pinion assembly 220 and a lower pinion assembly 230. Each pinion assembly is similar to pinion assembly 112, shown in FIGS. 1A and 1B. Each of the pinion assemblies includes a pinion 106 as well as an upper bearing 126 and a lower pinion bearing 136 through which the shaft 104 passes. These components are housed jointly within the upper shaft housing 120 and the lower shaft housing 130, which are coupled together. The shaft 104 is keyed in two locations, having an upper key 204a and a lower key 204b. These keys (204a and 204b) fit into a recess (not shown) in each pinion 106, coupling the shaft 104 to each pinion 106 when the shaft 104 rotates. Additional detail of the pinions 106 and keys (204a, 204b) will be discussed later, in connection with FIG. 3.

The keys 204a and 204b are each shorter than the overall length of the pinion 106, allowing the shaft 104 to translate up and down along a direction parallel to the length of the shaft assembly 110. The shaft passes through a fastener 210 at the bottom of the shaft assembly 110. The fastener 210 both holds the shaft 104 in place and allows the vertical position of the shaft 104 to be adjusted to engage the shaft 104 with the motor coupling 122 or disengage it from then motor coupling 122, as described below.

The shaft 104 is provided with two annular extensions 206a and 206a, one or more of which may be attached after the shaft 104 is passed through the fastener 210 and the bearings (124, 134) within the two upper shaft housings 120 and lower shaft housings 130. These annular extensions may be well-known structures such as split-rings or other suitable structures and serve to widen the shaft 104 where the extensions are installed. In some embodiments, the shaft 104 may be provided with recesses configured to receive the annular extensions. As shown, in FIG. 2, the annular extension 204a is placed just above the point at which the shaft 104 begins to pass through the top side of the fastener 210. The second annular extension 204b is placed at the point where the shaft 104 exits the bottom of the fastener 210.

It will be appreciated that, when the shaft assembly 110 is initially in configuration 200a (as it may be during assembly), the shaft 104 is uncoupled from the motor coupling 122, but is retained within the shaft assembly 110 by at least annular extension 206a pressing against the top of edge of the fastener 210. If the fastener 210 is inserted further into the aperture 208 in the bottom of the shaft assembly 110, the fastener 210 will push against the annular extension 206a, pushing the shaft 104 upwards toward the motor coupling 122.

When the fastener 210 is fully inserted into the aperture 208, the top end 202 of the shaft 104 is driven into the motor coupling 122, coupling the shaft 104 to the motor 102 (not shown in FIG. 2). As shown, the top end 202 of the shaft 104 resembles a hex bolt and is configured to mate with a correspondingly-shaped opening in the motor coupling 122. The fastener 210 may be a suitable structure such as a pin or bolt with a channel configured to receive the shaft 104. In certain preferred embodiments, the aperture 208 is threaded and the fastener 210 is configured with complementary threads. In these and other embodiments, the fastener 210 may be configured to have a hexagonal cap, enabling the fastener 210 to be inserted and withdrawn using standard tools such as a wrench or crank.

When the shaft assembly 110 is in configuration 200b, with the fastener 210 fully inserted into the aperture 208, and the shaft 104 coupled to the motor 102, the shaft 104 may be disengaged from the motor 102 by withdrawing by partially fastener 210 from the aperture 208. When the fastener 210 is withdrawn from the aperture 208, the top edge of the fastener 210 pushes downward against the annular extension 206b, withdrawing the shaft 104 from the motor coupling 122, as indicated by the position of the top end 202 of the shaft 104 in configuration 200a. While withdrawing the shaft 104 might allow the shaft to fall out of the motor coupling 122 under the influence of gravity, the presence of the annular extension 206b provides additional downward force to ensure the shaft 104 disengages despite possible friction due to thermal expansion or slight flexion of the shaft 104 which might otherwise prevent the shaft 104 from disengaging easily.

Importantly, the keys 204a and 204b of the shaft 104 remain coupled to the pinions 106 in both configurations 200a and 200b. This enables that the shaft assembly 110 (and particularly the pinions 106) to remain engaged with the rack assembly 140 corresponding to each pinion 106. This feature enables the rack assemblies 140 to move freely when they are pushed or pulled upon while the shaft 104 is disengaged from the motor assembly 102. Notably, even in configuration 200a, the shaft assembly 110 remains fully assembled. In the event of a motor failure, a user of the sliding support mechanism need only loosen the fastener 210 to restore (manual) functioning of the mechanism.

In certain embodiments, one or more of the keys 204a and 204b are configured to prevent each fastener 210 (and thus the shaft 104) from being fully removed from the aperture 208 when the shaft assembly 110 is fully assembled. In other embodiments, each fastener 210 may be provided with a visual indicator (such as a colored area, a line, or other marking) indicating how far the fastener 210 (and therefore the shaft 104) may be safely withdrawn.

Figure 4:
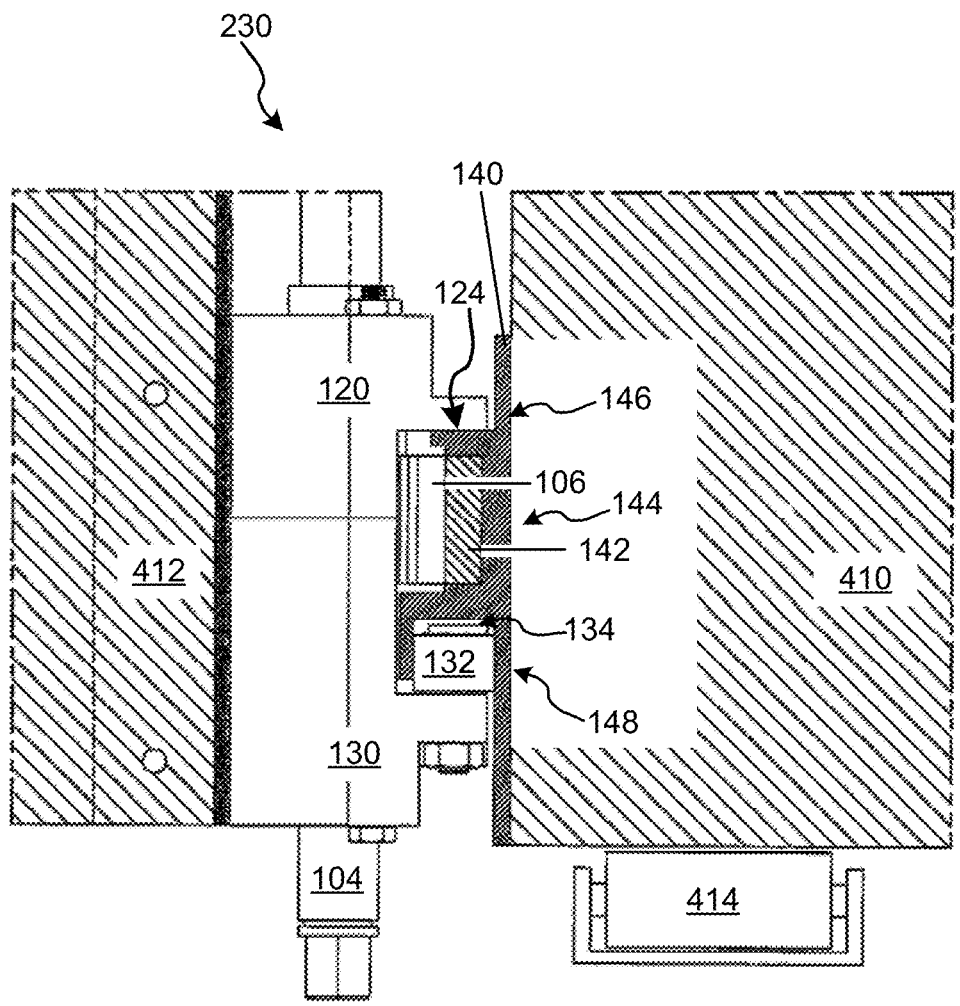
FIG. 4 is a cross-sectional view of another alternate embodiment.

FIG. 4 is an exploded view of an example upper pinion assembly 220, an example lower pinion assembly 230, and the shaft 104. Ancillary components such as screws are shown, but not labeled. The upper pinion assembly 220 is shown with its corresponding upper shaft housing 120 and lower shaft housing 130, along with its pinion 106, upper bearing 126, and lower bearing 136. The motor coupling 122 is shown attached to the upper shaft housing 120 belonging to the upper pinion assembly 220.

Similarly, the lower pinion assembly 230 is shown with its corresponding upper shaft housing 120 and lower shaft housing 130, along with its pinion 106, upper bearing 126, and lower bearing 136. Although the shaft housings belonging to the lower pinion assembly 230 are labeled identically to those for lower pinion assembly 220, they differ as previously discussed. In particular, the lower shaft housing 130 of lower pinion assembly 230 houses the aperture 208, which is configured to receive the fastener 210, as previously described. Also shown are the annular extensions 206a, and 206b.

Also pictured is the shaft 104, with its top end 202 and bottom end 212. The keys 204a and 204b are shown on the surface of the shaft 104. Also shown are the locations of the annular extensions 206a and 206b (also shown and previously described with the lower pinion assembly 230)

During operation, or when the supported object is deployed, the racks 142 and pinions 106 may be subject to forces that will tend to cause misalignment leading to poor gear mesh, which in turn can result in structural damage and malfunctions. Accordingly, all elements of the mechanism are design to accommodate realistic amounts of displacement. For instance, each rack 142 is deeper than the teeth of each pinion 106 are long, allowing each pinion 106 to remain fully engaged even if they are displaced away from the corresponding rack 142. For similarly, the vertical extent of the rack is larger than the vertical extent of the teeth of the pinions 106, allowing the shaft 104 and pinions 106 to move up and down within an acceptable range while the pinions 106 remain fully engaged with each rack 142. Further detail is shown in FIG. 4.

FIG. 4 is a cross-sectional view illustrating elements of preferred embodiments discussed above. FIG. 4 depicts a portion of a mechanism such as mechanism 100. This example shows a lower pinion assembly 230 engaged with a rack assembly 140. In this example, the shaft assembly 110 (represented by only the lower pinion assembly 230) is attached to shaft assembly mount 412 allowing it to be integrated into a larger structure (not shown). The rack assembly 140 is shown coupled to a frame 410 of an object (not shown) to be supported. The object (not shown) is also partially supported from below by a roller or conveyor 414. This example illustrates an application in which the mechanism 100 may be subject to external forces. For instance if the shaft assembly 110 is rigidly coupled to a larger structure using the shaft assembly mount 412, and the frame 410 of object being supported is not perfectly flat, the mechanism 100 will be subject to varying vertical displacements as the object slides in and out. These and other displacements are managed as described above in connection to FIG. 1B.

Some preferred embodiments include two pairs of mutually parallel rack assemblies 140, each pair disposed on one side of an object. For example, the object being supported may be an RV slide-out with one pair of racks on each sidewall. In this example, shaft assemblies would be fixed to the sidewalls of the RV (either within recessed compartments or protruding from the exterior walls). An example application of one such embodiment is shown in FIG. 5

Figure 5:
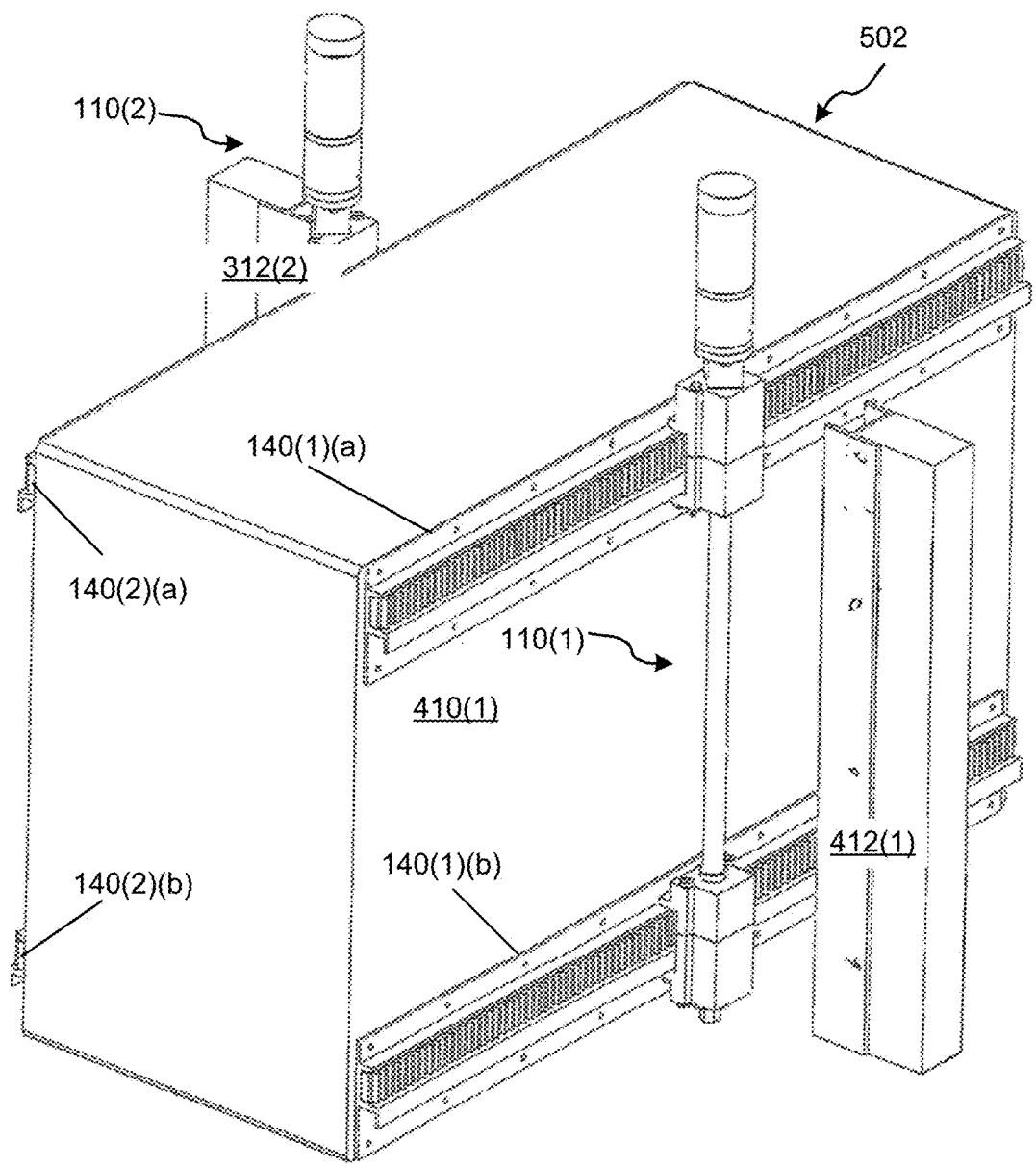
FIG. 5 is perspective view of an exemplary application of an alternative embodiment.

In the example of FIG. 5, the frame 410 belongs to an RV slide-out 502. The slide-out 502 has a frame 410 on two sides, labeled 410(1) and 410(2) for clarity. Each frame 410 is supported by a corresponding shaft assembly 110, labeled 110(1) and 110(2), respectively coupled to a pair of rack assemblies 140. The individual corresponding rack assemblies are labeled 140(1)(a) and 140(1)(b) on the right side, and 140(2)(a) and 140(2)(b) on the left side. Each shaft assembly 110 is configured to couple to the corresponding shaft assembly support 412, labeled 412(1) and 412(2). Each shaft assembly support 412 is shown as a mount configured to couple to the corresponding shaft assembly 110 and further configured to be installed within the walls of an RV (not shown).

Embodiments Directed to RV Slide-Outs

To further elucidate benefits of the present invention, aspects of embodiments suited to applications in RVs will be now be discussed in detail. Such embodiments include support mechanisms as well as methods for integrating and employing such support mechanisms within RVs.

As discussed briefly above, RVs frequently make use of slide-outs to increase available living space. For instance, a bedroom slide-out might increase the size of a bedroom area by extending outward from the walls of the RV. Typically, these slide outs are supported from below (under the floor of the module) by a roller or conveyor-type structure. In the conventional slide-outs discussed above, the slide-out will have racks mounted to each of two sides which are perpendicular to the outer walls of the RV. These racks engage with a shaft coupled to motor which drives the slide-out in and out. Because of the dimensions and weight of such slide-outs, there will be a dedicated motor for each of the two perpendicular side walls.

It should be understood that these slide-outs may not be entirely rigid. For instance, the floors may bend, flex, and warp over time. In addition, uneven distribution of weight within the slide-out module due to furniture of the presence of people inside them may also cause non-uniform displacement in the floors. Such unevenness will often lead to one side of the slide-out being displaced upward or downward with respect to the opposite side. In addition, as the slide-out is deployed, it is cantilevered over the ground. Since only the portion of the slide in contact with the walls or floor of the RV is supported, the racks on both sides will experience a torque which will tend to rotate the slide-out with respect to the racks. In addition, if the racks are driven by a rotor and shaft, the racks will experience a back-torque that will tend toward twisting the slideout relative to the walls of the RV. If a slideout support is not properly designed, all these forces can lead displacement and flexure of various components of the support mechanism leading to poor gear mesh between the racks and the respective shafts used to drive the racks. Poor gear mesh can ultimately lead to excessively worn gear teeth and eventual failure of the mechanism.

Because such mechanisms rely on motors with very high gear reductions (due to need for the motors to fit unobtrusively with the walls of an RV), it can be extremely difficult or impossible to manually deploy or stow and RV slide-out if one or more motor fails. As a result, it is important to provide a means of decoupling the racks from the motors to allow the shafts to turn.

With these concerns in mind, deficiencies of prior art RV slide-out supports become evident. An example prior art slide-out mechanism used in thousands of RVs or more every year uses a splined shaft rather than distinct pinions coupled to a bearing-mounted shaft as disclosed herein. The example prior art mechanism does not connect the motor/brake solidly to the upper pinion housing in order to provide a means for separating the motor/brake from the pinion gears (the splines) which are meshed with linear gear racks mounted to the sides of the slide-out. Separating the motor/brake from the splined shaft pinion gear assembly is required to be able to manually push the slide-out back in for travel should a drive failure occur.

This example prior art mechanism replaces the motor/brake threaded holes intended to bolt the drive Motor/brake to a drive housing, with four set screws loosely fitting in holes in the housing. An external screw, threaded through the wall channel and into a cooling slot in the motor/brake, keeps the motor engaged with the splined shaft assembly. This attachment design enables removing the external screw and prying the motor/brake up manually, disconnecting it from the splined shaft assembly. This enables pushing the slide-out in manually from outside the RV.

By contrast embodiments disclosed herein allow for bolting the motor assembly 102 solidly to the upper pinion housing 220 and provides a secondary means for disconnecting the motor from the pinions 106, as previously discussed.

An additional advantage is realized by allowing the pinion housings (220, 230) to float up and down with the slide-out since the motor is not anchored to the outside wall. This is important since up and down movement of the slide-out occurs when the slide-out (represented schematically by object 410 of FIG. 4), rolling on rollers beneath (represented schematically by rollers 414 in FIG. 4) does not move perfectly in plane with the pinion housing assembly fastened to the outside wall (represented schematically by shaft assembly mount 412 in FIG. 4). In embodiments disclosed herein, the pinion housings (such as the pinion housings 220 and 230 shown in FIG. 2) are floated up and down by surfaces (e.g., upper wear surface 124 and lower wear surface 134) on the pinion housings (220, 230) that ride against surfaces on each rack assembly 140 to the side of the slide-out. This movement is allowed and guided with proper slide bearing surfaces.

Another advantage of embodiments disclosed herein is the way gear pitch circle alignment is maintained between the pinions 106 and the racks 142. This is accomplished in certain embodiments by providing cam follower type bearings (as bearings 132) in the pinion housings that run inside the U-shaped channel 148 contained in the rack assembly 140. These cam follower type bearings in the pinion housing are fore and aft of each pinion 106 and prevent each pinion from being pushed in or out relative to the corresponding rack 142

The loose fit of the pinion housings 220 and 230 with the wall mounting channel (see 412(1) in FIG. 5) allow in and out and up and down movement as described earlier. In and out movement translates to side to side movement of the slide-out. Allowing for this is important since the slide which is rolling on rollers beneath it may be steered left or right as the slide-out is retracted or extended. If the slide-out is steered to press one bearing housing of the bearings 132 into the channel 148 causing it to bottom out in the channel 148, gear alignment is still maintained by the bearings 132 in the pinion housing (i.e., 220 or 230) pushing against the rack assembly 140 and forcing the slide-out to be pushed away. Similarly, on the opposite side of the slide-out, the bearings 132 on the opposite side pull the pinion housing (220 or 230) out of the channel 148 while still maintaining proper gear mesh. Secondarily, the force of the drive motor acting between the pinions 106 and the racks 142 produces a twisting force on the pinion housings (220, 230). This twisting is partially reacted against by the housing trying to turn in the wall channel but is also satisfactorily reacted by having fore and aft bearings 132 reacting against this twisting force.

Yet another advantage of certain embodiments is the use of replaceable low friction bearings for the bearings 126 and 136 in the housings (220, 230) that the shaft 104 turns in. The reaction of the gear force is carried in these bearings. Lowering this bearing friction increases the force available to drive the slide-out.

As mentioned embodiments herein provides a means of disconnecting shaft 104 from the motor assembly 102 to allow manual retraction of the slide. The motor assembly 102 is connected to the shaft 104 using a standard fitted coupling (represented as motor coupling 122). The motor shaft extension is round with a flat surface that mates with an internal flat surface in the coupling and the end of the shaft 104 is machined to a hexagon shape to mate with the internal hex of the coupling (see FIG. 2, for example). To disconnect the motor assembly 102 from the shaft 104 the shaft 104 is simply withdrawn from the motor coupling 122. The coupling 122 is prevented from disengaging from the motor assembly 102. Drawing the shaft out of the motor coupling 122 causes disengagement of the shaft 104 and free movement of the slide-out. The upper and lower pinions 106 stay engaged with the shaft 104 because the internal keyways in the pinions 106 (see keys 204a and 204b and their positions within the pinions 106 in FIG. 2) are long enough to stay engaged when the shaft 104 is pulled out of the motor coupling 122. The end 212 of the shaft 104 (see FIG. 2) opposite the coupling end 202 is extended and machined for wrench flats to be able move the slide with a wrench when shaft 104 is disengaged.

The foregoing description and accompanying drawings illustrate principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A sliding support mechanism, the mechanism comprising:
   a first rack and a first pinion, the first pinion coupled to the first rack, the first rack having a-translational axis;
   a motor having a rotor;
   a shaft having a first end and a second end, the shaft coupled to both the rotor and to the first pinion at the first end of the shaft;

a bearing configured to receive the shaft and encircle the shaft at a point between the rotor and the second end of the shaft;

an upper housing coupled to the first end of the shaft and to the motor; and a lower pinion assembly coupled to the second end of the shaft, wherein the lower pinon assembly includes an aperture;

wherein the aperture of the lower pinion assembly is configured to receive the second end of the shaft;

wherein in a first state a fastener is positioned in the aperture such that the shaft and rotor are engaged; and wherein in a second state the fastener is withdrawn by at least a fixed distance from the aperture, thereby disengaging the first end of the shaft from the rotor such that the first rack translates freely along the first translational axis when a force is applied to the support mechanism in a direction parallel to the first translational axis;

the mechanism further comprising a set of threads within the aperture, and the fastener is threaded.

2. The mechanism of claim 1, the mechanism further comprising:

a second rack and a second pinion, the second pinion housed in the lower pinion assembly and coupled to the second rack, the second rack having a second translational axis parallel to the first translational axis; and a second bearing configured to receive the shaft and encircle the shaft at a point between the second end of the shaft and the first end of the shaft.

3. The mechanism of claim 2;

wherein, during the second state in which the shaft is disengaged from the rotor, the motor is configured to remain coupled to the upper housing.

4. The mechanism of claim 1, wherein the threaded fastener includes a visual marker along its length; and wherein, when the threaded fastener is withdrawn by less than the fixed distance from the aperture, the visual marker is hidden within the aperture.

5. The mechanism of claim 1, wherein the mechanism of the first rack further comprises:

an upper sliding surface and a lower the sliding surface;

wherein the first rack assembly comprises:

a recess configured to surround the first rack on three sides while leaving teeth of the first rack exposed;

a channel disposed beneath the recess, a roof of the channel forming a floor of the recess, the channel having an inner surface and an outer surface both extending from the roof of the channel, a distance between the inner surface and the outer surface defining a channel width; and an upper surface forming a roof of the recess;

wherein the lower sliding surface comprises:

a set of at least two rollers and a lower wear surface;

wherein the upper sliding surface comprises an upper wear surface;

wherein the lower wear surface is coupled to, and extends above, the lower sliding surface;

and wherein a height of the lower wear surface exceeds a height of each of the rollers.

6. The mechanism of claim 5, wherein the channel is formed of a first material characterized by a first hardness and wherein at least one of the upper wear surface and the lower wear surface is composed of a material characterized by a second hardness less than the first hardness.

7. A sliding support mechanism in a recreational vehicle, the mechanism comprising:

a first rack and a first pinion, the first pinion coupled to the first rack, the first rack having a first translational axis;

a second rack and a second pinion coupled to the second rack, the second rack having a translational axis parallel to the first translational axis;

a first motor having a first rotor;

a first shaft having a first end and a second end, the shaft coupled to both the rotor and to the first pinion at the first end of the shaft;

a first bearing configured to receive the shaft and encircle the shaft at a point below between the first rotor and the second end of the shaft;

a second bearing configured to receive the second end of the first shaft and encircle the first shaft at a point between the first rotor and the second end of the shaft;

a frame coupled to a recess in the recreational vehicle and to the first and second racks, the first and second racks coupled to a first side of the frame;

a first housing coupled to the first end of the first shaft and to the first motor; and a second housing coupled to the second end of the first shaft, wherein the second housing includes an aperture;

wherein the aperture of the second housing is configured to receive the second end of the shaft;

wherein in a first state a fastener is positioned in the aperture such that the shaft and rotor are engaged; and wherein in a second state the fastener is withdrawn by at least a fixed distance from the aperture, thereby disengaging the first end of the shaft from the rotor such that the first and second racks translate freely along the translational axes when a force is applied to the support mechanism in a direction parallel to the translational axes;

the mechanism further comprising a set of threads within each aperture and each of the fasteners is threaded.

8. The mechanism of claim 7, the mechanism further comprising:

third and fourth racks;

third and fourth pinions, the third and fourth pinions coupled, respectively, to the third and fourth racks;

a second motor, having a second rotor;

a second shaft coupled to the rotor of the second motor and to the third pinion at a first end of the second shaft and to the fourth pinion at the second end of the second shaft;

third and fourth bearings, configured to encircle the second shaft at respective points between the second rotor and the second end of the second shaft;

wherein the third and fourth racks are coupled to a second side of the frame parallel to the first side of the frame;

a third housing coupled to the first end of the second shaft and to the second motor; and a fourth housing coupled to the second end of the second shaft, wherein the fourth housing includes an aperture.

9. The mechanism of claim 8, wherein the aperture of the fourth housing is configured to receive the second end of the second shaft and the aperture of the fourth housing is coupled to a second fastener, wherein the second end of the second shaft is positioned in the aperture such that the first end of the second shaft and rotor of the second motor are engaged while the second fastener is in a first position, and wherein the first end of the second shaft is disengaged from the rotor of the second motor after the second fastener is withdrawn a predetermined distance from the aperture to a second position, thereby causing the third and fourth racks to translate freely along the translational axes when a force is applied to the support mechanism in a direction parallel to the translational axes.

10. The mechanism of claim 9 wherein the first motor and the second motor are coupled to the first housing and the third housing, respectively; and wherein, during a state in which at least one of the first and second shafts is disengaged from a respective rotor, the corresponding motor remains coupled to the corresponding first or third housing.

* * * * *